Nov. 21, 1933.　　　N. E. WAHLBERG　　　1,935,965

CLUTCH MECHANISM

Filed July 16, 1931

Witness:
Chas. R. Koursh

Inventor
Nils E. Wahlberg,
Offield Tokhope Scott & Poole, Attys.

Patented Nov. 21, 1933

1,935,965

UNITED STATES PATENT OFFICE 1,935,965

CLUTCH MECHANISM

Nils Erik Wahlberg, Kenosha, Wis., assignor to The Nash Motors Company, Kenosha, Wis., a corporation of Maryland Application July 16, 1931. Serial No. 551,128

3 Claims. (Cl. 192—67)

This invention relates to improvements in transmission gearing, and more particularly to intermediate speed clutch devices used in automobiles, although the invention is not necessarily limited to such use.

More specifically my invention is advantageous in its application to a synchronizing device of an automobile transmission wherein, as previously constructed, selective speeds are provided through a sliding gear clutch located between a high speed and an intermediate speed driving member, and said gear clutch is frictionally engaged with one or the other driving member so as to bring them to the same speed, before their respective clutch teeth are moved into fully engaged position.

Such synchronizing devices also include a constantly meshed gear reduction train between the high and intermediate speed driving members, the gears of which are usually of the helical type so as to minimize noise from the constantly running gears.

It has been demonstrated that with cylindrical gear clutches of the type hereinabove described, there is a tendency for the clutch teeth to become disengaged while running, thus accidentally throwing the transmission out of gear while the automobile is under way. This tendency appears to be greater with the intermediate gear, probably due to the fact that the intermediate speed drive member is driven through helical gears as described, and therefore has greater tendency to shift longitudinally; furthermore, the intermediate drive member has somewhat shorter longitudinal bearing support than the high speed member, and thus may twist or weave slightly on its axis while under driving power. This shifting or weaving action appears to be partially responsible, at least, for the tendency toward accidental disengagement of the clutch parts as above described.

In carrying out my invention, I provide an improved form of cylindrical clutch preferably applied to the intermediate speed gear clutch in which the clutch teeth are mutually tapered slightly in a direction tending to hold the clutch parts in engagement with each other when under driving force, said tapered construction being limited, however, to such a degree that it does not appreciably affect the ordinary shifting operation of the clutch, nor does it set up sufficient play between the clutch members to be noticeable in the form of backlash between the driving and driven members.

The invention may best be understood by reference to the accompanying drawing, in which Figure 1 is a side view of a transmission gear case with parts removed to show details of the synchronizing mechanism with the gears in neutral position.

Figure 1:
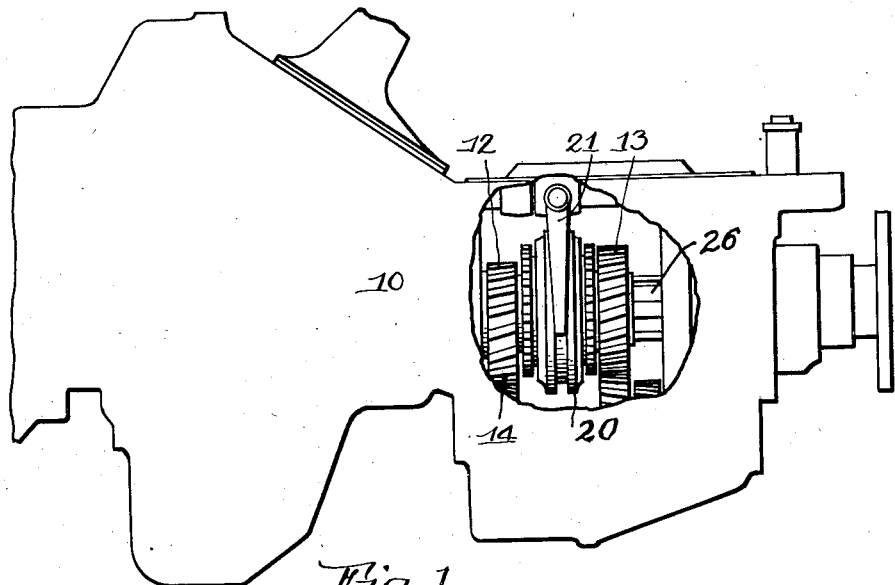

Referring now to details of the embodiment of my invention illustrated in the drawing, a transmission gear housing 10 is provided with the usual gearing including a high speed driving member 12 and an intermediate speed driving member 13. The high speed member 12 is driven directly through the clutch in the usual manner, and has constant meshed engagement with the intermediate speed member 13 through a speed reduction gearing including gear 14, shaft 15 and gear 16. In the form shown, all of the speed reduction gears are of the helical type.

The high speed member 12 has a series of clutch teeth 12ª formed about its periphery, and the intermediate speed member 13 has another series of clutch teeth 13ª. A sliding clutch collar 20 shiftable by yoke 21 in the usual manner is mounted between the two sets of clutch teeth 12ª and 13ª. The clutch collar 20 has a series of internal clutch teeth 22ª arranged continuously around the end of the collar 20 adjacent the high speed member 12, said internal teeth being arranged so as to be engageable with the high speed clutch teeth 12ª when the clutch collar is shifted toward the left.

Another set of internal clutch teeth 23ª are arranged at the opposite end of the collar 20 in position to be engageable with the intermediate speed gear teeth 13ª when the clutch collar is shifted toward the right.

Mounted within the sliding clutch collar 20 and rotatably connected thereto by a series of external teeth 25ª is a synchronizing member 25 having a centrally disposed web 25ᵇ and a hub 25ᶜ which is splined on the driven shaft 26. The synchronizing member 25 has a pair of oppositely extending cone friction surfaces 27 and 28 adapted to be engaged respectively with corresponding friction surfaces 29 and 30 carried by the high speed member 12 and intermediate speed member 13, respectively.

A plurality of spring pressed balls 31 are mounted about the periphery of the synchronizing member 25 and centrally thereof, said balls being normally adapted to engage in centrally disposed recesses 32 formed between each aligned pair of internal clutch teeth 22$^a$ and 23$^a$ carried on the shifting clutch collar 20.

Figure 2:
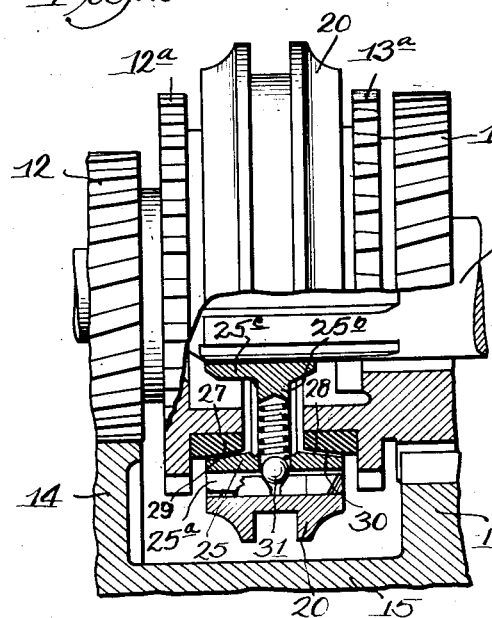
Figure 2 is an enlarged detail view of the synchronizing mechanism shown in Figure 1, with the lower part thereof shown in section.

In Figures 1 and 2 the synchronizing clutch parts are shown in neutral position. When it is desired to shift into gear in either direction, for instance into engagement with the low speed member 13, the shifter yoke 21 is operated through the usual gear shift handle (not shown) in such manner as to urge the sliding clutch collar 20 toward the right. By reason of the engagement of the spring pressed balls 31 in their respective recesses 32 between each pair of internal teeth 22$^a$ and 23$^a$, the synchronizing member 25 is shifted bodily in the same direction so as to bring the cone friction surface 28 into engagement with the rotating surface 30 carried by the driving member 13. As soon as these two friction members come into engagement, the driving member 13 is caused to be rotated at the same speed as the synchronizing member 25 and the sliding clutch collar 20. Further shifting movement of the clutch collar 20 will then overcome the resistance of the spring pressed balls 31, causing them to be depressed over their adjacent teeth 22$^a$ and the clutch teeth 23$^a$ may then be moved into fully engaged position relative to the driving clutch teeth 13$^a$ without clashing, since both the driving and the driven members are then being rotated at the same speed.

The synchronized driving connection with the high speed member 12 is accomplished in the same manner, the shifting collar 20 being moved toward the left so that the conical friction member 27 engages the corresponding friction member 29 on the high speed member 12 before the clutch teeth 22$^a$ and 12$^a$ are actually engaged.

Figure 3:
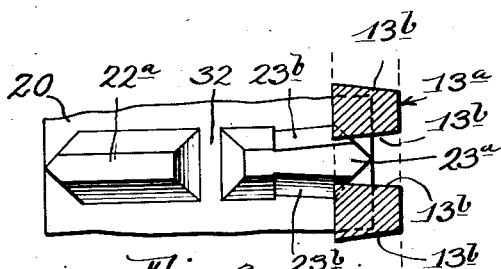
Figure 3 is an enlarged detail view showing a pair of coacting clutch teeth in partially engaged position relative to each other.
Figure 4:
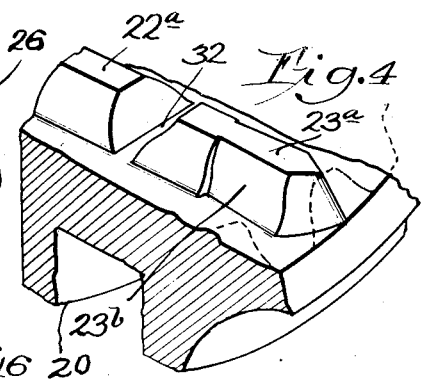
Figure 4 is an enlarged perspective view showing one of the tapered internal teeth carried by the shiftable clutch member.

Referring now to the novel features which form the subject matter of the present invention, it will be seen that I form the series of internal teeth 23$^a$ with their lateral faces 23$^b$, 23$^b$ flared or diverging outwardly toward the end of the tooth which engages the external teeth 13$^a$ on the intermediate driving member. This construction is best shown in Figures 3 and 4. Similarly the lateral faces 13$^b$, 13$^b$ of said external teeth 13$^a$ are tapered or converged inwardly toward the teeth 23$^a$ as clearly shown in Figure 3. The amount of divergence of the internal teeth and convergence of the external teeth is relatively small, for the purpose intended, a total included angle of approximately two degrees between opposite sides of each tooth, or one degree between one side and the center line of the tooth, giving satisfactory results, although under varying conditions the total included angle between opposite sides may be varied from one to four degrees. The illustration of the angle in Figures 3 and 4 is somewhat exaggerated merely for the purposes of illustration.

It will be understood, of course, that with the coacting internal and external clutch teeth being tapered as described, each internal tooth 23$^a$ is slightly wider at its outer than its inner end, while the space between each adjacent pair of external teeth 13$^a$ is narrowest at the end where the coacting tooth 23$^a$ enters, as clearly shown in Figure 3. Consequently when the driving teeth 13$^a$ are rotated in either direction, the angle of engagement of the teeth is such as to tend to hold the clutch members in mutual engagement under sufficient tension to overcome any ordinary stresses tending to throw them out of engagement.

In the form shown, it will be noted that I have applied the tapered tooth construction only to the clutch members connecting the intermediate drive member 13 and the driven shaft 26. It is manifest, of course, that the coacting clutch teeth of the high speed connection 12 may also be formed with a taper in a similar manner, if desired.

As a simple and preferred process for forming the taper on the gear clutch teeth, I find that this can be readily accomplished by first shaping the teeth in their standard form, and then burnishing the teeth to tapered form by means of a master gear suitably tapered, the burnishing operation, of course, being carried out before the gear teeth are given their final heat treatment.

Although I have illustrated and described one particular embodiment of my invention, it will be understood that I do not wish to be limited to the exact construction shown and described, but that various changes and modifications may be made without departing from the spirit and scope of my invention.

I claim:

1. In a transmission device, a rotatable selective speed driving member and a coaxial sliding clutch driven member, one of said members having internal clutch teeth and the other member having co-operating external clutch teeth, said clutch teeth having mutually engaging lateral faces each diverging toward the opposite clutch member at an angle of approximately one degree from their normal meeting lines parallel with their axes so as to resist axial disengagement when under driving torque.

2. In a transmission device, a rotatable intermediate speed driving member and a sliding clutch driven member, one of said members having internal clutch teeth and the other member having co-operating external clutch teeth, said clutch teeth having mutually engaging lateral faces each diverging toward the opposite clutch member at an angle of approximately one degree from their normal meeting lines parallel with their axes so as to resist axial disengagement when under driving torque.

3. In a gear clutch, two mutually engageable clutch members telescopically mounted with respect to each other, one having a series of clutch teeth with their bases mounted lengthwise on the inner face of the outer clutch member, and the other having co-operating clutch teeth with their bases mounted lengthwise on the outer face of the inner clutch member, the lateral faces of each of said sets of teeth being mutually divergent toward each other so as to resist axial disengagement of said clutch members when under driving torque.

NILS ERIK WAHLBERG.